Feb. 7, 1956 F. J. DARAGO 2,733,510
CALIBRATION GRAPH PLOTTER
Filed July 21, 1954 4 Sheets-Sheet 1
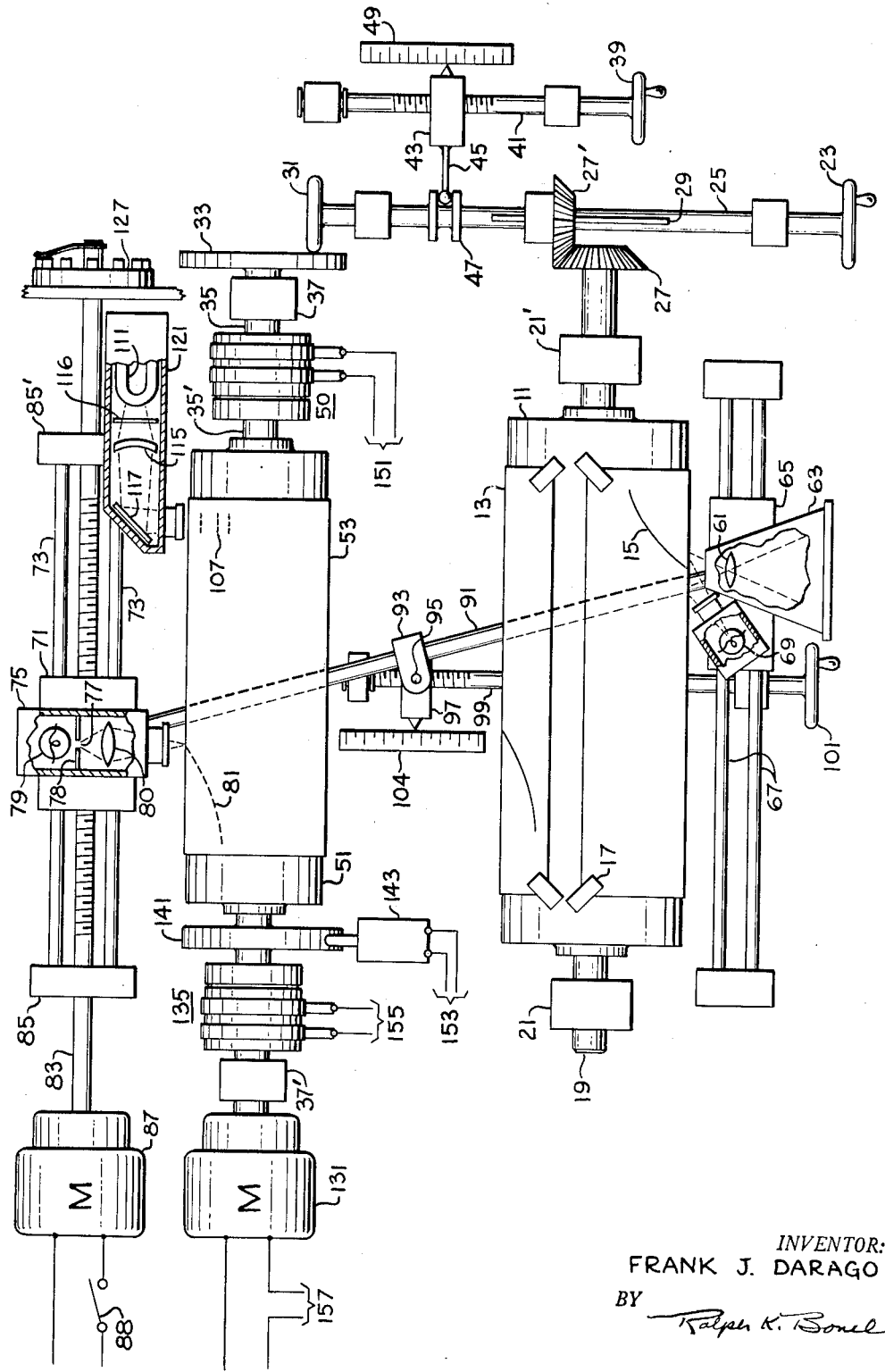
INVENTOR:
FRANK J. DARAGO
BY
AGENT Feb. 7, 1956
F. J. DARAGO
2,733,510
CALIBRATION GRAPH PLOTTER
Filed July 21, 1954
4 Sheets-Sheet 2
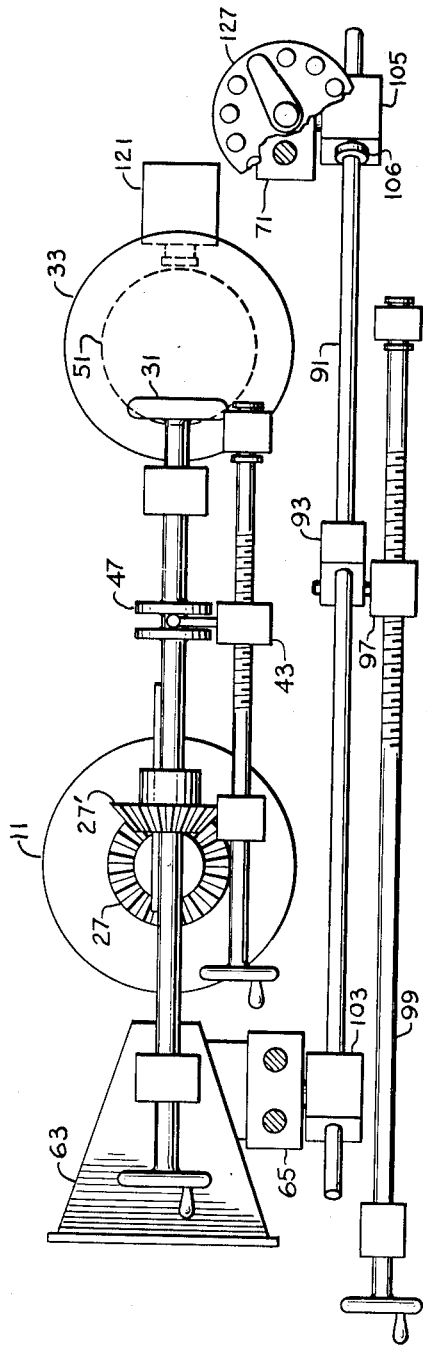
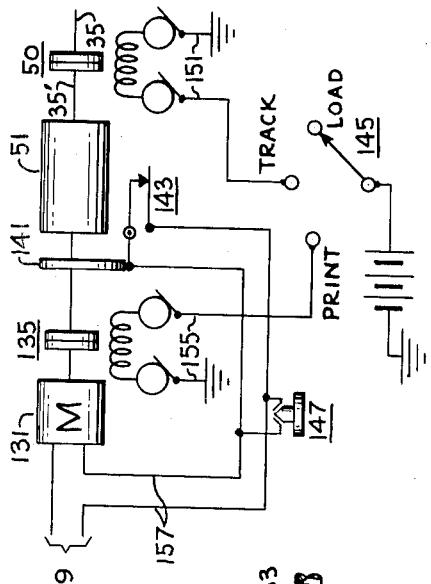
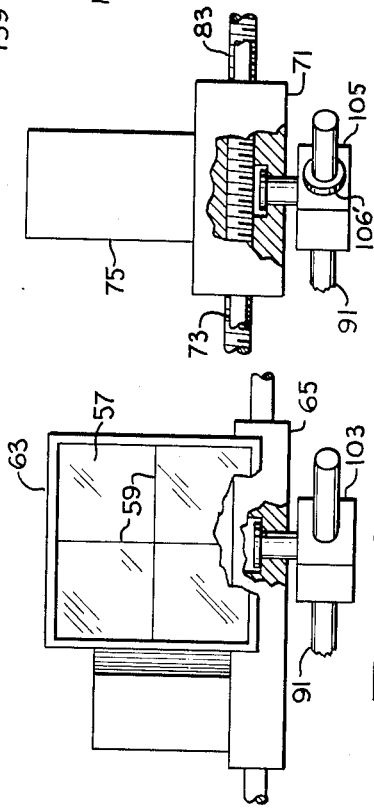
INVENTOR:
FRANK J. DARAGO
BY
*Ralph K. Bonell*
AGENT Feb. 7, 1956  F. J. DARAGO  2,733,510
CALIBRATION GRAPH PLOTTER
Filed July 21, 1954  4 Sheets-Sheet 3

INVENTOR:
FRANK J. DARAGO
BY
AGENT

Feb. 7, 1956   F. J. DARAGO   2,733,510
CALIBRATION GRAPH PLOTTER

Filed July 21, 1954   4 Sheets-Sheet 4

INVENTOR:
FRANK J. DARAGO
BY
Ralph K. Bonell
AGENT

United States Patent Office 2,733,510
Patented Feb. 7, 1956

2,733,510

CALIBRATION GRAPH PLOTTER

Frank J. Darago, Highland Park, N. J., assignor to Applied Science Corporation of Princeton, Princeton, N. J., a corporation of New Jersey Application July 21, 1954, Serial No. 444,700

11 Claims. (Cl. 33—1)

This invention relates to plotting apparatus for making a photographic reproduction of a graph of the values of a variable quantity, with provision for effecting independent changes of scale along the two axes of the graph in the process of reproduction and for recording a series of reference markings along one or both said axes.

The invention is particularly concerned with means for the production, on photographic film or paper, of graphs of uniform or selected size and of uniform line quality from original plots which may vary in size and in width and uniformity of line.

In the operation of the apparatus of the invention a manually controlled index is caused to follow the original graph while a spot of light, automatically controlled in accordance with the position thereof, is caused to trace a photographically developable copy of desired size and of standard line quality. The operation is carried out in a light which does not affect the photographic reproduction medium.

One application of such uniformly prepared graphs is in connection with data-processing apparatus wherein modifications of data are made by automatic means in accordance with information furnished by a calibration curve exhibiting the relationships between corresponding values of modified and unmodified data. Apparatus of the foregoing character, operating on digital data, is disclosed in the co-pending application of Brinster and Donath for "Numerical Data Corrector," Serial No. 397,187 filed December 9, 1953 and the provision of plotting means for producing calibration curves in standard form and having certain reference markings required for use with the apparatus of said application is one of the principal objects of the present invention. Reference is also made to a second co-pending application of Brinster & Donath for "Plotter," Serial Number 377,092, filed August 28, 1953, which discloses means for effecting modifications of graphically displayed data, also making use of a calibration curve. When the inventions of said two prior applications are practiced jointly, the same calibration curve, prepared by the means disclosed herein, may supply information for the modification of both digital and graphical data.

Another object of the present invention is to provide manually controlled photographic means for copying a graph, or like line display, which includes means for independently adjusting the scale of reproduction along two axes.

Another object is to provide in copying apparatus of the foregoing character means for automatically producing a series of reference lines along an axis of the reproduced graph, said lines respectively corresponding in position to selected points on said graph uniformly spaced along the other axis thereof.

Another object is to provide in apparatus of the foregoing character means for producing lines of constant co-ordinate value in association with the reproduced graph.

Another object is to provide in apparatus of the foregoing character manually controlled means for following an original plot and photographic means responsive thereto for producing a copy of said plot in which the line quality is independent of the line quality of the original.

A further object is to provide in apparatus of the foregoing character photographic reproduction means including an optical system wherein the geometrical accuracy of the reproduced graph is independent of the properties of said optical system.

Other objects and advantages of the invention will be apparent upon consideration of the following specification taken in connection with the appended drawings in which:

Fig. 1 is a plan view of a calibration graph plotter constructed in accordance with the principles of the invention;

Fig. 2 is a partial front elevation of the apparatus of Fig. 1 showing displaceable monitoring and index means;

Fig. 3 is a partial rear elevation of the apparatus of Fig. 1 showing displaceable optical recording means;

Fig. 4 is a right end elevation of the apparatus of Fig. 1;

Fig. 11 is a circuit diagram of switching connections of electrical components of Fig. 1.

Figure 7:
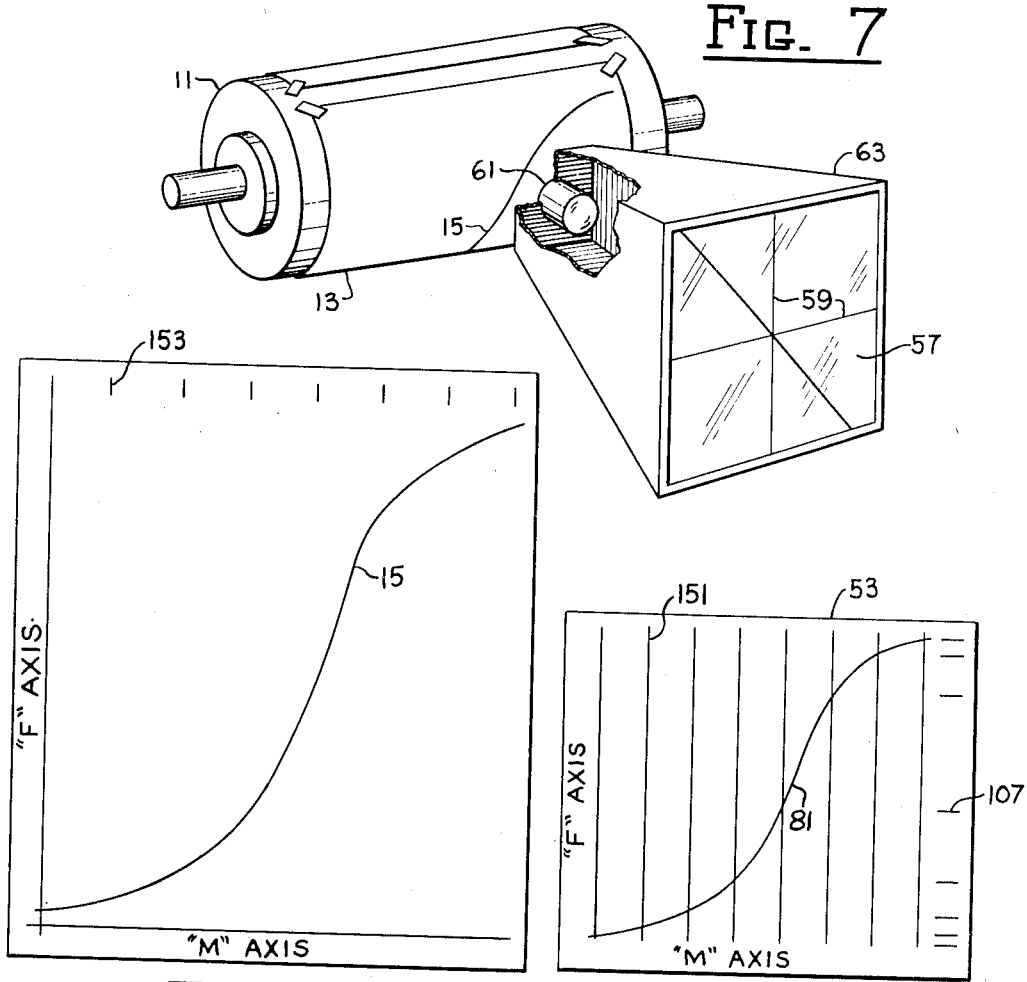
Fig. 7 is a perspective view of the monitoring means of Fig. 2, in association with other parts of the apparatus of Fig. 1.

In Fig. 1 there is illustrated one form of calibration graph plotter, constructed in accordance with the principles of the invention, for preparing copies of calibration graphs in standard form. Reference numeral 11 is applied to a drum about the exterior surface of which is removably mounted a sheet 13 exhibiting an original calibration graph 15 to be reproduced. Sheet 13 is held to drum 11 by suitable means, such as adhesive strips 17. Graph 15 may be plotted to any scale within the limits acceptable to the machine. The width and quality of line used may vary from one graph to another and also within the extent of an individual graph, without affecting the quality of the reproduction.

Drum 11 is mounted on shaft 19 journaled in bearing blocks 21, 21'. Shaft 19 is driven by tracking hand wheel 23 through jack shaft 25 and bevel gears 27, 27', the latter gear having a sliding fit on shaft 25 and being constrained to rotation therewith by spline 29.

Figures 5, 6:
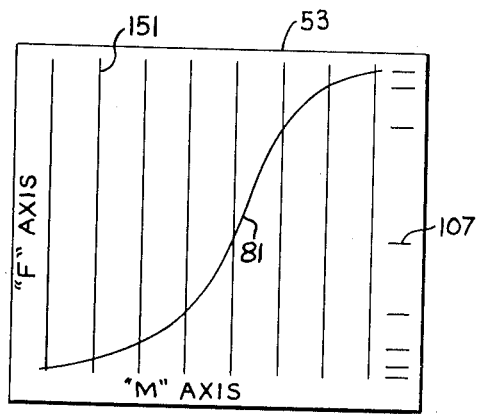
Fig. 5 illustrates a sheet displaying an original graph to be reproduced by the apparatus of Fig. 1.
Fig. 6 illustrates a sheet displaying a reproduction of the graph of Fig. 5, together with reference markings therefor.

Shaft 25 mounts at the end thereof opposite handwheel 23 a driving friction disc 31 engaging driven disc 33 mounted on shaft 35 of which shaft 35' is an extension, the two being journaled in bearing blocks 37, 37'. The radius at which disc 33 is engaged by disc 31 is controlled by hand wheel 39, rotation of which rotates shaft 41 having a threaded portion in engagement with traveling nut 43 thereby to displace arm 45 mounted by nut 43 and loosely engaging grooved collar 47, fast on shaft 25. The adjustment of the ratio of displacements of shafts 19 and 35 provided by operation of hand wheel 39 is for the purpose of changing scale along one axis of the reproduced graph and will be referred to herein as the "F" axis scale adjustment (Figs. 5 and 6). The position of nut 43 as read on fixed scale 49 indicates this ratio.

A second drum 51 mounted on shaft 35', normally coupled to shaft 35 by magnetic clutch 50 for rotation therewith, is adapted to mount about the exterior surface thereof a sheet 53 of photographic film or paper removably held thereto by suitable means (not shown), on which a version of graph 15 is to be produced. Markings displayed on an illuminated portion of the surface of sheet 13 are projected in enlarged form on translucent screen 57 (Fig. 7) bearing crossed index lines 59, by an optical system illustrated as lens 61. Screen 57 and lens 61 are mounted in a monitor hood 63 borne by carriage 65 displaceable along stationary guides 67 in the direction of the axis of shaft 19. Carriage 65 also bears the source of light 69 for the illumination of the portion of sheet 13 whose image is projected on screen 57.

A second carriage 71 is displaceable along guides 73 in a direction parallel to the axis of shaft 35' and bears a lamp housing 75 mounting a "point" source of light 77, said source comprising a small aperture in a mask 78 illuminated by lamp 79. An image of point source 77 is projected on film 53 by an optical system illustrated as lens 80, said image being displaceable relative to the film to trace a photographically developable line constituting reproduced graph 81. For its traverse along guides 73, carriage 71 bears a nut, integral therewith, engaging a threaded portion of drive shaft 83 journaled in bearing blocks 85, 85', shaft 83 being driven at a relatively slow speed by motor 87 which may incorporate speed reducing means and which is controlled by switch 88.

Figure 10:
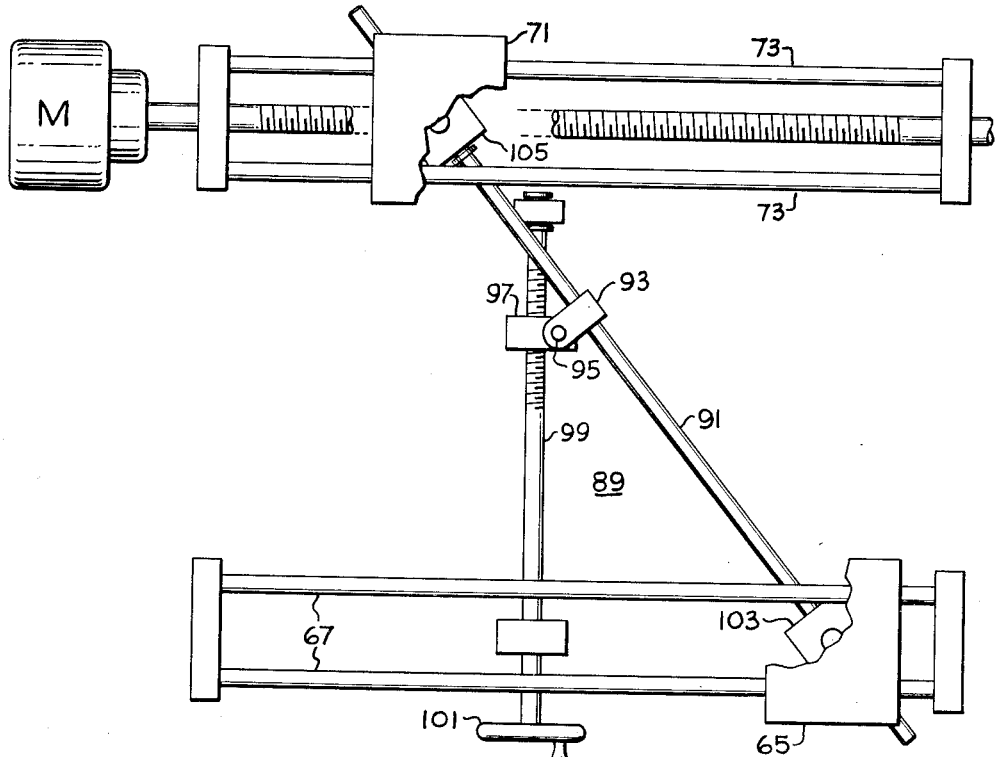
Fig. 10 is a plan view of the proportional divider mechanism forming a part of the apparatus of Fig. 1.

Change of scale along the second axis of the graph, referred to herein as the "M" axis (Figs. 5 and 6), is provided for by an adjustable proportional divider mechanism 89 (Fig. 10) comprising a divider bar 91 centrally slidably mounting a bearing block 93 pivoted at 95 on travelling nut 97 displaceable along a threaded portion of rotatable control shaft 99 through the operation of hand wheel 101. The end portions of bar 91 pass through and slidably engage bearing blocks 103, 105, pivotally mounted on carriages 65 and 71, respectively, for limited rotation about an axis perpendicular to the parallel planes of guides 67 and 73. The position of nut 97 is readable on stationary scale 104 as an indication of the change of scale effected.

Figure 8:
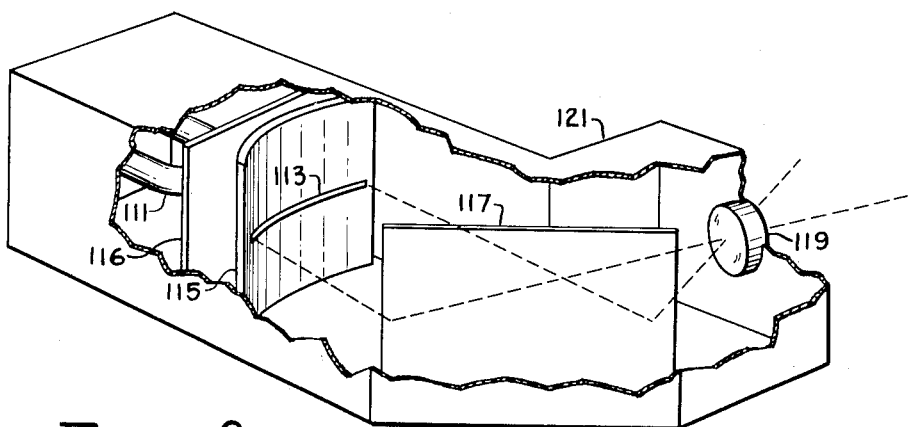
Fig. 8 is a perspective view showing an optical system including a stroboscopic lamp, forming a part of the apparatus of Fig. 1.

Bar 91 is longitudinally restrained at one end, as by collars 106, 106' (Figs. 3 and 4). To produce reference or marker lines 107 at the right-hand edge of film 53 there is provided a U-shaped stroboscope flash lamp 111 (Fig. 8) which, when excited, illuminates a curved horizontal slit 113, preferably photographically produced in a mask 115, said slit serving as a line source of light an image of which is projected in 1:1 ratio on film 53 for recording lines 107 thereon. A diffusing screen 116 preferably is interposed between lamp 111 and slit 113 to secure uniform illumination of the slit. The projection system is seen in Fig. 8 as comprising mirror 117 and lens 119 mounted in housing 121. The curvature of slit 113 is to compensate for the unavoidable curvature of the field of the optical system under the imposed constructional conditions.

Figure 9:
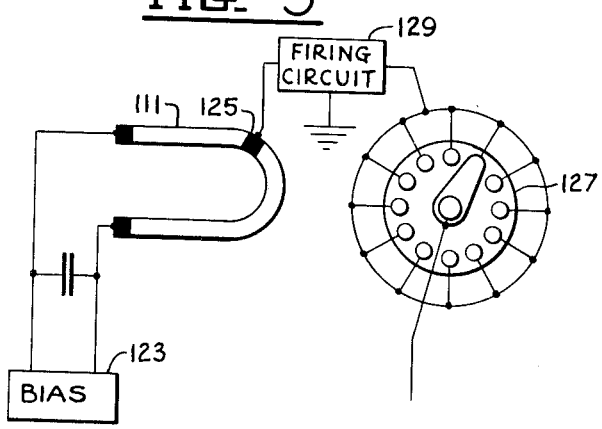
Fig. 9 is a circuit diagram of the excitation circuit of the lamp of Fig. 8.

Lamp 11, as seen in the circuit diagram of Fig. 9, has a constant bias applied by voltage source 123, which bias is slightly below the flashing point (the ionization voltage) of the lamp. An ionizing voltage pulse, to flash the lamp, is applied to auxiliary electrode 125 under the control of multiple-contact rotary switch 127 having uniformly angularly spaced stationary contacts and having the rotating contact arm thereof driven from shaft 83, said switch applying a trigger voltage to a firing circuit 129 which in turn supplies the ionization voltage to the lamp.

To control the rotation of drum 51 for printing lines of constant co-ordinate value on film 53 in association with graph 81, as later described herein, there is provided a motor 131 coupled to shaft 35' by way of magnetic clutch 135 having slip ring and brush connections to the clutch coil. A cam 141 mounted on shaft 35' operates a break-contact switch 143 in the motor control circuit at a selected angular position of drum 51.

Fig. 11 shows the control circuits of motor 131 and of clutches 50 and 135. A three position "function" switch 145 is provided having a "Load" position in which clutches 50 and 135 are both de-energized and drum 51 is free to be rotated for phasing purposes, a "Track" position in which clutch 50 alone is energized to couple shafts 35 and 35', and a "Print" position in which clutch 135 alone is energized to couple motor 131 to shaft 35' for the printing lines of constant "M" value. The supply circuit of motor 131 may be temporarily completed by push button switch 147 when switch 143 is open, the operation of the latter switch, as noted, being controlled by cam 141.

In operation, with function switch 145 in the "Load" position, carriage 71 is positioned at one limit of its travel, for example the left-hand limit, by the operation of motor 87 under the control of switch 88. Limit switch means (not shown) may be employed to define the limiting position of the carriage. The scale change to be effected along the "M" axis of the graph is set by the operation of handwheel 101. A sheet 13, displaying a graph 15 to be reproduced is mounted on the exterior surface of drum 11 by adhesive strips 17, with the start of graph 15 aligned with the vertical line of index lines 59, as seen in projection on screen 57. The scale change to be effected along the "F" axis of the graph is set by operating handwheel 39. A sheet 53 of photo-sensitive film or paper is mounted on the exterior surface of drum 51 in a selected axial position relative to the limiting position of carriage 71 and the drum rotated to the position at which the tracing of graph 81 is to start. Drum 11 is rotated, through the operation of handwheel 23, to bring the start of graph 15 at the horizontal line of index lines 59. Drum 51 and 11 are rotatable independently of one another in the "Load" position of switch 145. Tracking can now commence.

To track, switch 145 is placed in the "Track" position and motor 87 started by the operation of switch 88. Operation of motor 87 simultaneously slowly traverses carriages 65 and 71 in opposite directions at relative rates determined by the set "M" axis scale change. Clutch 50 being energized in the "Track" position, operation of handwheel 23 is adapted to rotate drums 11 and 51 simultaneously, the ratio of the respective displacements being determined by the set "F" axis scale change. As carriage 65 is displaced to the left, the operator makes use of the operation of this handwheel to maintain the intersection of index lines 59 coincident with graph 15, as seen in projection on screen 57, the intersection of said lines being the effective tracking index. While this index is caused to follow graph 15 the image of light source 77 on film 53 traces a reproduction thereof through the combined effects of the traverse of carriage 71 in synchronism with carriage 55 and the rotation of drum 51 in synchronism with drum 11.

In the above operation axial tracking is at a constant rate, due to the constant speed of motor 87, while the rotary displacements of drums 11 and 51 are in accordance with the form of graph 15. It will be noted that the operator in following graph 15 is at liberty to disregard breaks and other irregularities which are obviously errors in the drawing of the curve. The entire operation, as previously noted, is carried on in light which does not produce fogging of film 53.

As an example of the precision obtained in practice through the use of the described apparatus, if the optical system of the tracking monitor has a magnification of ten, a precision of one-tenth percent in the length of 10 inches will be attained if the intersection of index lines 59 does not depart more than one-tenth of an inch from the projected image of graph 15 on screen 57. The time consumed in tracking a complete curve, in practice, may be of the order of 3 minutes.

In the described process of reproducing graph 15, the geometrical accuracy and line quality (uniformity of width and density) of the reproduction, graph 81, are not dependent on the properties of an optical system as in the usual methods of photographic reproduction where, inevitably, different distortions occur in different portions of the lens fields, introducing appreciable errors when a copy having the dimensions of, say 5 x 7 inches is made. This freedom from the effects of lens aberrations constitutes an important advantage of the plotting mechanism herein described.

The printing of reference or marker lines 107 (Fig. 6) along the "F" axis of reproduced graph 81 is controlled by rotary switch 127. By reason of its drive from constantly rotating shaft 83 the contacts made by switch 127, which result in the flashing of lamp 111, occur at uniformly spaced time intervals, corresponding, respectively, to uniformly spaced positions of carriage 71 (and of the image of point source 77) along the "M" axis of graph 81. Accordingly, since, in the tracing of graph 81, the displacement of film 53 from the starting position in the direction of the "F" axis occasioned by rotation of drum 51 is equal at each instant to the co-ordinate along said axis of the currently plotted point on the graph, the positions of the lines printed by the flashing of lamp 111 represent the "F" co-ordinates of points on the graph having uniformly spaced "M" co-ordinates. If "F" and "M" co-ordinates correspond, respectively, to uncorrected and corrected data values the positions of marker lines 107 represent a sequence of uncorrected data values corresponding respectively, to a sequence of uniformly spaced corrected data values. The utility of such marker lines in modifying digital data values through the use of the means of application Serial No. 397,187 is described in said application.

The printing of lines of constant "M" value in association with a reproduced graph, as lines 151 (Fig. 6), is accomplished by first selecting the several desired co-ordinate values of the lines and indicating said values by marks along the "M" axis of the original graph at one edge of the sheet displaying said graph, as marks 153 (Fig. 5). After the tracking operation, with function switch 145 in the "Print" position, handwheel 23 is rotated to a position allowing marks 153 to be projected on screen 57. Drum 51 is positioned by motor 131, through control by push-button switch 147 and cam-actuated-switch 143, to the correct starting position along the "F" axis, a momentary contact at switch 147 causing rotation of the drum until stopped by the breaking of the motor circuit by switch 143. Through the control of motor 87 by switch 88 the vertical line of index lines 59 is brought to coincidence with a selected one of marks 53. Switch 145, being in the "Print" position, clutch 50 is disengaged and clutch 135 is engaged.

In the presently arrived at angular position of drum 51, a second momentary contact at push-button switch 147 (of sufficient duration to result in the closure of switch 143) causes motor 131 again to rotate drum 51 until stopped by the opening of cam switch 143. During this travel the image of light source 77 traces one of lines 151. The other lines 151 are traced by repeating the above operation with index 59 aligned with other of marks 153. Preferably interlocking means (not shown) are used to energize lamp 79 (which supplies the illumination of source 77) only during the period taken up by the printing of a constant "M" co-ordinate line.

I claim:

1. Apparatus for the reproduction of a graph of a variable quantity comprising first support means for mounting a sheet displaying a graph to be reproduced, second support means for mounting a sheet of photo-sensitive material designed to receive a reproduction of said graph, a relatively displaceable index readable on a sheet mounted by said first support means, optical means for continuously projecting a luminous point image on a sheet mounted by said second support means, means for simultaneously displacing said index relative to a sheet mounted by said first support means and said image relative to a sheet mounted by said second support means at constant rates in the respective directions of one pair of corresponding axes of original and reproduced graphs including means for adjusting the ratio of said rates, and manually controlled means for effecting simultaneous displacements of said index and image relative to said sheets in selected ratio in the respective directions of another pair of corresponding axes of original and reproduced graphs including means for adjusting said last ratio, said two ratio adjusting means being operable independently one of the other.

2. Apparatus as claimed in claim 1 wherein said two ratio adjusting means each includes index means for indicating the respective scale transformations effected thereby.

3. Apparatus as claimed in claim 1 wherein the means for adjusting the ratio of said two constant rates includes a proportional division mechanism forming a driving connection between said index and image displacing means, said mechanism comprising a pivot positionable to adjust said ratio and positioning means therefor.

4. Apparatus as claimed in claim 1 wherein each of said two-support means is in the form of a cylinder adapted to mount one of said sheets about the periphery thereof, said one pair of graph axes being respectively parallel to said cylinder axes and said other pair being respectively perpendicular to said one pair, said one displacing means inducing axial displacements of said index and image relative to said cylinders, and said other displacing means inducing rotary displacements of said cylinders about the respective axes thereof.

5. In apparatus for the reproduction of a graph of a variable quantity the combination of a first cylindrical support mounted for rotation about the axis thereof, there being a sheet displaying a graph to be reproduced mounted thereby about the periphery thereof, said graph having one of the two mutually perpendicular axes thereof parallel to said axis, a second cylindrical support mounted for rotation about the axis thereof, a sheet of photo-sensitive material mounted thereby about the periphery thereof for the reception of a reproduction of said graph, a displaceable index readable on said first sheet, means for projecting a small luminous spot on said photo-sensitive sheet, means for simultaneously displacing said index and spot parallel to the respective axes of said supports at constant rates including means for adjusting the ratio of said rates, and means for simultaneously rotating said two supports about the respective axes thereof including means for adjusting the ratio of the displacements about said axes, said two ratio adjustment means being operable independently one of the other.

6. In apparatus for the reproduction of a graph of a variable quantity the combination of a cylindrical support adapted to mount about the periphery thereof a sheet of photo-sensitive material for the reproduction of a graph, a pair of means for projecting first and second luminous images on said sheet respectively to trace a graph and imprint reference markings therefor, means for producing relative displacement between said two projecting means and said support in a direction extending about the axis of said support, means for producing continuous linear displacement of one of said projecting means relative to said support along the axis thereof, and means for controlling the projection of an image by the other of said projection means in accordance with the position of said one projection means along said axes.

7. Apparatus for the reproduction of a graph of a variable quantity comprising first support means for mounting a sheet displaying a graph to be reproduced, second support means for mounting a sheet of photosensitive material designed to receive a reproduction of said graph, a displaceable index readable on a sheet mounted by said first support means, optical means for continuously projecting a displaceable luminous point image on a sheet mounted by said second support means, means for simultaneously displacing said index relative to a sheet mounted by said first support means and said image relative to a sheet mounted by said second support means at constant rates in the respective directions of one pair of corresponding axes of original and reproduced graphs including means for adjusting the ratio of said rates, manually controlled means for effecting simultaneous displacements of said index and image relative to said sheets in selected ratio in the respective directions of another pair of corresponding axes of original and reproduced graphs including means for adjusting said last ratio, said two ratio adjusting means being operable independently one of the other, means for intermittently projecting a second luminous image on said photo-sensitive sheet to imprint reference markings thereon, the potential location of said second image being varied relative to said sheet along said other graph axis synchronously with the displacement of said first image, and automatic means causing the projection of said second image at intervals corresponding to the passage of said first image through selected positions along said one graph axis.

8. Apparatus as claimed in claim 7 wherein said last means is adapted to cause projection of said second image at intervals corresponding to passage of said first image through uniformly spaced positions along said one graph axes.

9. In apparatus for the reproduction of a graph of a variable quantity, index means for following an original graph, means for producing relative displacements between said index means and said graph along two axes, recording means for making a reproduction of said graph, driving means including connections respectively constraining said recording means to follow said displacements along two axes, further driving means for displacing said recording means along one of said axes independently of said index means and clutch means for interrupting one of said driving connections and substituting a connection to said further driving means in lieu thereof.

10. Apparatus as claimed in claim 9 wherein said driving connections each comprises means for independently adjusting the ratio of displacements of said index and recording means along one of said axes.

11. In apparatus for the reproduction of a graph or like line display, index means for following an original graph, means for producing relative displacements between said index means and said graph in two dimensions a photo-sensitive recording medium, means for projecting a spot of light on said medium and means for producing relative displacements between said medium and said spot in said two dimensions in accordance, respectively, with like displacements between said graph and said index means including independently adjustable means determining the ratios between the first-mentioned displacements and the second-mentioned displacements.

References Cited in the file of this patent

UNITED STATES PATENTS

| 1,056,878 | Aspinwall et al. | Mar. 25, 1913 |
| 2,442,098 | Shewell et al. | May 25, 1948 |
| 2,624,848 | Hancock et al. | Jan. 6, 1953 |
| 2,638,671 | Ramsey | May 19, 1953 |

FOREIGN PATENTS

| 554,503 | Germany | July 2, 1932 |
| 727,371 | Germany | Nov. 4, 1932 |